ELLEN A. HALE.
ORNAMENTAL WALL-BRACKET.

No. 178,848. Patented June 20, 1876.

WITNESSES.
By Attorney

INVENTOR

UNITED STATES PATENT OFFICE.

ELLEN A. HALE, OF ROCKFORD, ILLINOIS.

IMPROVEMENT IN ORNAMENTAL WALL-BRACKETS.

Specification forming part of Letters Patent No. 178,848, dated June 20, 1876; application filed February 14, 1876.

*To all whom it may concern:*

Be it known that I, ELLEN A. HALE, of Rockford, in the county of Winnebago and State of Illinois, have invented a new and Ornamented Wall-Bracket; and I do hereby declare that the following is a full and exact description of the same, reference being had to the accompanying drawings, and to the letters of reference marked thereon.

Figure 1:
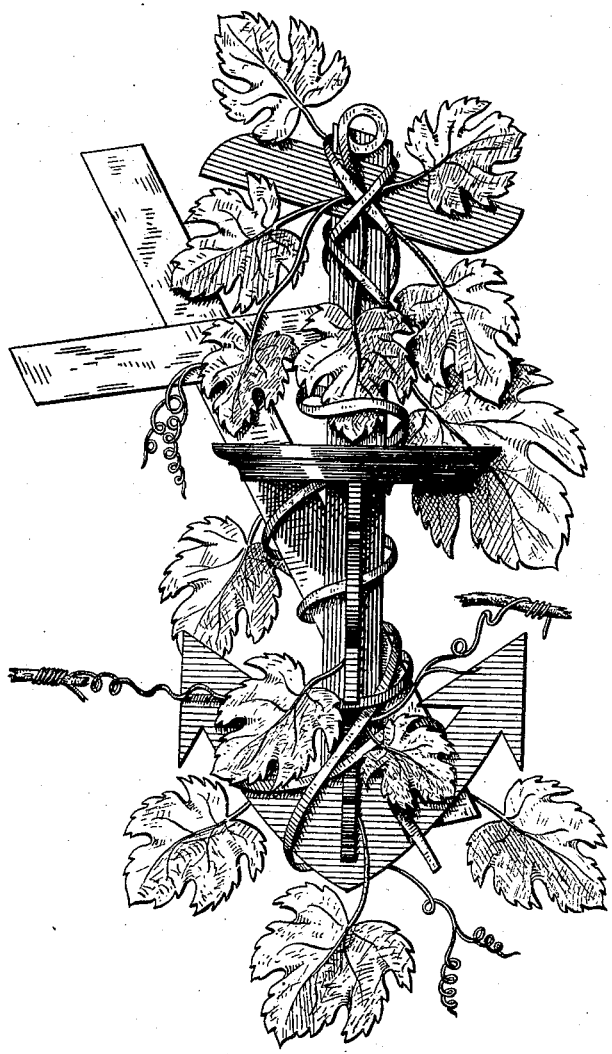
Figure 2:
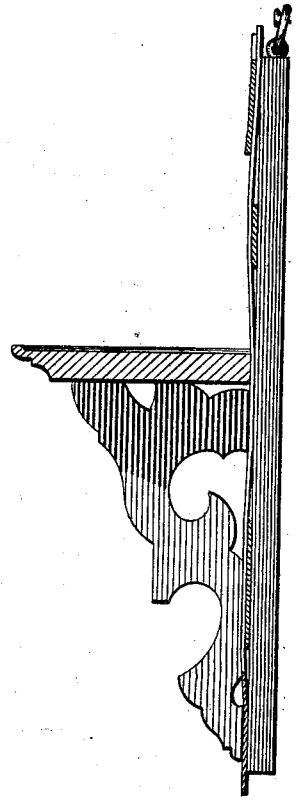

Figure 1 is a front view of a wall-bracket with a cross and anchor, with leaves and stems of vines intertwined; and Fig. 2 is a side view of the bracket, partly in section.

My invention has for its object the production, as a new article of manufacture, of an ornamental wall-bracket, wall-pockets for grass, &c., or slipper-holders, or other equivalent device; and the invention consists in combining with the ordinary wooden or metal bracket, or equivalent device, to be secured to the walls of rooms, of leaves, vines, symbols, &c., made of paper colored in any desired manner, these being intertwined or secured to the bracket by any convenient means.

In the drawing I have shown the ordinary construction of bracket, to which are secured a cross, anchor, and leaves, and having stems of vines, &c., intertwined, and represented as holding the cross, anchor, and leaves; but any other desired symbols or other devices may be substituted therefor.

The leaves may be colored to represent autumn or green leaves, and the symbols may be colored or gilded to suit the taste of the manufacturer.

It will be observed that the stems of the artificial leaves form a part of the leaf, having been cut from the same piece of paper-board, and does not necessitate the use of wires or other mechanical devices for holding or supporting the leaf upon the bracket. These leaves, stems, vines, &c., are made from smooth calendered paper-board, thus giving the surface of the ornamental work a finished appearance before the coloring and varnishing of the same is done; and as the material for the ornamentation is of paper-board alone, less skill is required in the manufacture, and a consequent reduction in the price of the product, without detracting from the beauty of the work.

I am aware that various methods have been adopted for ornamenting wall-brackets, &c., by means of natural leaves dried and pressed, and also varnished, and also that various designs of artificial flowers made of wax, flannel, &c., for ornamenting the walls of rooms, have been made, and these I do not claim; but What I do claim is—

As a new article of manufacture, a wall-bracket, or equivalent device, ornamented with artificial leaves, vines, or flowers, when the same are made from paper-board, substantially as described.

This specification signed and witnessed this 14th day of January, 1876.

ELLEN A. HALE.

Witnesses:
G. W. FORD,
CHAUNCEY HALE.